United States Patent Office

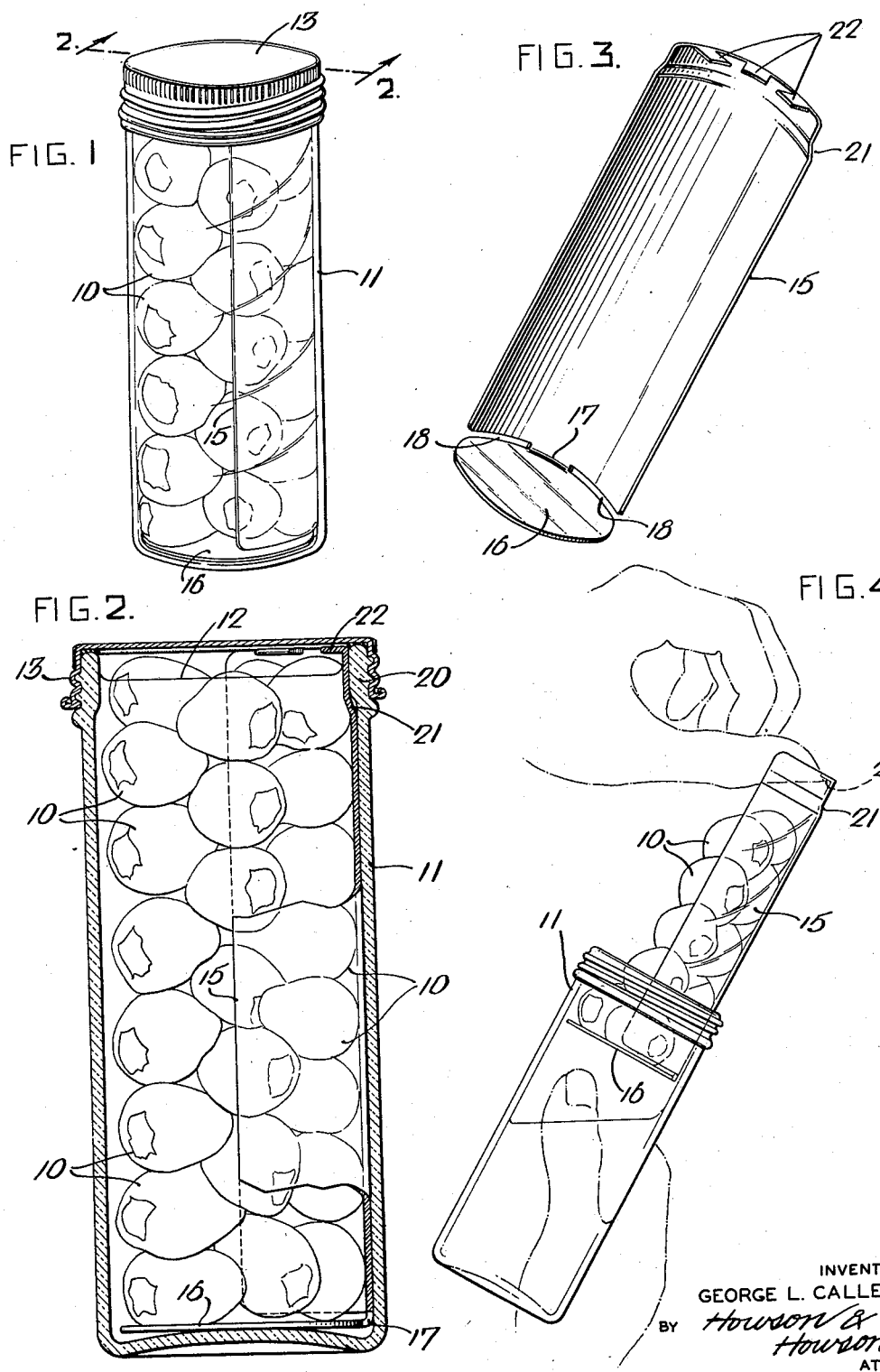

2,904,205
Patented Sept. 15, 1959

2,904,205
INSERT FOR A CONTAINER

George L. Callery, Wilmington, Del.

Application June 7, 1956, Serial No. 589,998

7 Claims. (Cl. 215—100)

This invention relates to an insert to be used in a container for discrete pieces of foodstuffs to facilitate removal of the container's contents. The invention also relates to the combination of the insert and the container.

Removal of foodstuffs from containers, particularly from the bottom of containers which are too long and narrow to accommodate the hand, has been almost a classical problem. Commonly a user will want only a few pieces of the food and dislikes emptying the whole container for those few pieces. Moreover, the problem is frequently complicated by packing the food in a liquid so that it is undesirable to reach into the container and the container cannot be over-turned to shake out the contents without spilling out the liquid.

The present invention is directed to an insert structure which can be packed in a container by the packer during packing. The insert is a simple and easily fabricated structure. It can be made to have sufficient strength to support foodstuffs and yet have sufficient flexibility to be useful even in slightly necked containers. It is easily manufactured and can be manufactured for a cost which will not materially increase the cost of the product to the manufacturer or to the ultimate consumer. It can be made of resilient material which is inoffensive in appearance and which is incapable of harming, discoloring or making distasteful any of the foodstuffs in the container. Moreover, it can be made transparent so that when included in a transparent container it is hardly noticeable. In addition, the insert will tend to hug the container walls so that it does not materially decrease the packing volume and so that the foodstuffs packaged will not be damaged by it in any way.

In its broadest aspects the present invention relates to an insert for a container for facilitating removal of discrete pieces of foodstuff. The insert has a sheet-like base and sheet-like sidewalls. The base is snugly accommodated within the cross-section of the container. The sidewalls are arranged perpendicular to the base and have a bottom edge adjacent to the base. The sidewalls conform in shape to the container and extend sufficiently far laterally to embrace discrete pieces of foodstuff. The base and the sidewalls are composed of resilient material and are connected together over at least part of their adjacent edges.

It will be observed that the insert may be an article of manufacture or it may be combined with the container. The resilience of the insert will permit it to be fixed or bent slightly to facilitate insertion into and removal from the container. This resilience is particularly helpful in the case of necked containers, and, where necked containers are employed, it is also desirable to obtain maximum flexibility by attaching the sidewalls to the base over only a sufficient portion of their adjacent edges to give needed support to the bottom to prevent its collapse under the weight of food as the sidewalls are being pulled to withdraw the insert from the container. In addition resilience in the sidewalls may aid in causing the insert to hug the container walls to the end that the packing volume is not materially decreased by the insert and the foodstuffs cannot be cut or otherwise damaged on it during packing.

For a better understanding of the present invention, reference is made to the following drawings in which:

Fig. 1 is a perspective view of a jar of olives employing the insert of the present invention;

Fig. 2 is a section taken along line 2—2 of Fig. 1;

Fig. 3 is a perspective view of the insert alone; and

Fig. 4 is a side elevational view showing the insert extending out of the container and illustrating the operation of the insert.

The structure shown in Figs. 1 and 2 represents a typical jar of olives modified only in the respect that it contains the insert of the present invention. This insert is useful in the packing of foodstuffs, such as olives, which are discrete pieces and particularly those which must be packed in juice to preserve the contents.

As can best be seen in Fig. 2 the olives 10 are packed in juice within jar 11. The juice extends nearly to the meniscus 12 near the top of the jar, just below the removable metal cover 13. While it may be relatively easy for one to remove the top row of olives from this jar without great inconvenience, the deeper into the jar one must go, the more difficult it becomes to reach the olives. The difficult task is made no easier by the presence of the juice into which one must reach and it is usually desirable to retain the juice in the jar in order to preserve the olives.

The present invention makes access to the olives which are below the top row or two considerably easier and makes it possible to conserve the juice in the jar.

As seen in Fig. 3 a preferred version of the present invention may be formed of plastic material such as polyethylene molded and formed to the proper size in one molding operation. The principal parts of the device are sidewalls 15 and a bottom 16. Both the sidewalls and the bottom conform to the shape of the interior of the container and lie as close to the container walls and bottom as possible in order to avoid loss of packing space. In a preferred form of the invention the insert may be formed of transparent, relatively rigid resilient material such as clear styrene, vinyl or acrylic plastics, which is particularly satisfactory for use with glass containers since such materials will detract very little from the transparency of the bottle or jar. Moreover, such material is chemically inert and will not harm the contents in any way or make them distasteful or discolored.

The sidewalls 15 and the bottom 16 are connected along a portion of their common edges, which portion preferably does not extend over the whole length of the boundaries of the bottom and sidewalls. Slots 18 provide additional flexibility in the sidewalls, and the portion 17 is made sufficiently long that it has sufficient strength to support the weight of the contents on the base under the pull on the sidewalls exerted to remove the insert and the contents from the container. In other versions of the present invention the sidewalls may be fixed to the base over their whole lateral length. It will be observed that the sidewalls and the bottom both hug the respective portions of the container and it will be obvious that the shape of the insert may be modified to fit the shape of its container, although cylindrical containers are undoubtedly the most common and most practical type. The upper end of the jar is necked or narrowed in portion 20, the outer surface of which is threaded to engage the threads of cap 13. Accordingly the insert must be stepped at 21 in order for the insert to fit snugly within the container.

At the top of the sidewalls are tabs 22 which are added to aid the removal of the insert from the container. These tabs are preferably radially inwardly extending and lie immediately below the top so that they are easily accessible and normally above the meniscus 12 of the juice. By placing the thumb or a finger beneath the tabs 22 or one of them it is possible to withdraw the insert and its contents from the jar. The resilience of the insert permits its inward movement as the necked portion 20 is passed, the slots 18 accounting for added flexibility in addition to the natural flexibility of the material of the insert. As shown in Fig. 4, it is possible to withdraw the insert as far as necessary to afford easy access to the olives.

The insert shown is half round, and experience has shown this form to be a particularly desirable one. However, for some purposes sidewalls need not extend quite as far around as they do in the embodiment illustrated. To be effective however, they should extend sufficiently far around to embrace one of the discrete pieces of foodstuff. The half round arrangement normally embraces half of the contents and supplies a shelf below the other half so that it prevents their falling out when the insert is withdrawn while the jar is full. However, the half round insert is sufficiently flexible to afford easy removal. The jar should be tilted slightly as shown in Fig. 4 if the shelf effect of the insert is relied upon. Of course the insert is normally not withdrawn as far as illustrated in Fig. 4 unless the unconsumed pieces only remain in the bottom of the jar. However, withdrawal to the point shown in Fig. 4, while the jar is filled to the extent illustrated, enables one to select the contents without unnecessarily handling the contents in the process.

A particular embodiment of the present invention has been described. Other modifications of the invention will occur to those skilled in the art and all such modifications are intended to be within the scope and spirit of the present invention.

I claim:

1. An insert for a jar of essentially uniform cross-section, said insert comprising a sheet-like base snugly accommodated within the cross-section of the container and sheet-like sidewalls arranged generally perpendicular to the base and having a bottom edge adjacent to the edge of the base, said sidewalls conforming in shape to the sidewalls of the jar and extending sufficiently far laterally to embrace discrete pieces of any contents which the jar is adapted to contain, said base and sidewalls being connected together over at least part of their adjacent edges and being composed of resilient material capable of sufficient deformation to permit withdrawal of the insert through the neck of the jar.

2. The insert of claim 1 in which a tab extending inwardly is provided at the top of sidewalls for facilitating removal of the insert from the container.

3. The insert of claim 2 for use in a cylindrical container, in which the base is circular and the sidewalls are a cylindrical segment.

4. The insert of claim 3 in which the insert is composed of a transparent, resinous material.

5. The insert of claim 4 for use in a glass jar wherein the top is slightly necked, in which insert a stepped top, corresponding to the neck of the jar is provided and the connection between the base and sidewalls extends along their adjacent edges only sufficiently far to support the weight of the contents of the container on the base against a pull on the top of the sidewalls.

6. In combination a jar of essentially uniform cross-section and an insert for the jar comprising a sheet-like essentially planar base snugly accommodated within the cross-section of the jar and sheet-like sidewalls arranged perpendicular to the base and having a bottom edge adjacent to the edge of the base, said sidewalls conforming in shape to the jar sidewalls and extending sufficiently far laterally to embrace discrete pieces of any contents which the container is adapted to contain, said base and sidewalls being connected together over at least part of their adjacent edges and being composed of resilient material capable of sufficient deformation to permit withdrawal of the insert through the neck of the jar.

7. In combination a cylindrical glass jar having a necked top and an insert for the jar composed of resilient transparent material and comprising a disc base slightly smaller than the inside cross-section of the jar, sheet-like sidewalls arranged perpendicular to the base and having a bottom edge adjacent to the edge of the base, said sidewalls adapted to be snugly engaged by the jar and extending sufficiently far laterally around the cylindrical surface to embrace discrete pieces of any contents which the container is adapted to contain, said sidewalls being stepped near the top edge in a position corresponding to the neck of the jar and inwardly extending tab adjacent to the top edge of the sidewalls.

References Cited in the file of this patent

UNITED STATES PATENTS

| | | |
|---|---|---|
| 1,007,368 | McGavity | Oct. 31, 1911 |
| 1,906,593 | Higgins | May 2, 1933 |
| 1,937,222 | Gallahan | Nov. 28, 1933 |
| 2,618,563 | Barnhard | Nov. 18, 1952 |
| 2,628,914 | Stiehm | Feb. 17, 1953 |